(12) United States Patent
Kuperstein (10) Patent No.: US 11,522,982 B2
(45) Date of Patent: Dec. 6, 2022

(54) STATUS INDICATORS FOR MOBILE VOICE DEVICES

(71) Applicant: Zachary Kuperstein, Brooklyn, NY (US)

(72) Inventor: Zachary Kuperstein, Brooklyn, NY (US)

( * ) Notice: Subject to any disclaimer, the term of this patent is extended or adjusted under 35 U.S.C. 154(b) by 152 days.

(21) Appl. No.: 17/181,034

(22) Filed: Feb. 22, 2021

(65) Prior Publication Data
US 2022/0272183 A1    Aug. 25, 2022

(51) Int. Cl.
*H04M 1/02* (2006.01)
*H04M 1/724* (2021.01)
*H04W 4/10* (2009.01)

(52) U.S. Cl.
CPC ......... *H04M 1/0202* (2013.01); *H04M 1/724* (2021.01); *H04M 1/0262* (2013.01); *H04M 2215/2093* (2013.01); *H04W 4/10* (2013.01)

(58) Field of Classification Search
CPC .. H04M 1/0202; H04M 1/724; H04M 1/0262; H04M 2215/2093; H04W 4/10
See application file for complete search history.

(56) References Cited

U.S. PATENT DOCUMENTS

| | | | |
|---|---|---|---|
| 6,438,390 B1 | 8/2002 | Awan | |
| 6,738,460 B1 | 5/2004 | Bruzesse | |
| 8,351,868 B2 | 1/2013 | Garra et al. | |
| 9,621,462 B2 | 4/2017 | Hui et al. | |
| 9,723,130 B2 | 8/2017 | Rand | |
| 10,499,238 B2 | 12/2019 | Narang et al. | |
| 2011/0124383 A1* | 5/2011 | Garra | H04M 1/724 340/815.4 |
| 2012/0202485 A1 | 8/2012 | Mirbaha et al. | |
| 2020/0250940 A1* | 8/2020 | Davis | H04W 4/80 |

FOREIGN PATENT DOCUMENTS

| | | | |
|---|---|---|---|
| JP | 11340900 | 12/1999 | |
| JP | 2004015263 | 1/2004 | |
| KR | 100664147 | 1/2007 | |
| KR | 100822725 | 4/2008 | |
| WO | 2019132682 | 7/2019 | |
| WO | WO-2019227534 A1 * | 12/2019 | ............. H04B 1/385 |

OTHER PUBLICATIONS

Luxafor Switch—Truly Wireless Led Availability Indicator With a Remote Control Unit That Eliminates Distractions, Source: https://luxafor.com/luxafor-switch-meeting-room-availability-indicator-light/, Date Accessed: Oct. 19, 2020.

* cited by examiner

*Primary Examiner* — Ankur Jain
*Assistant Examiner* — Angelica M Perez
(74) *Attorney, Agent, or Firm* — David E. Novak; Brannon Sowers & Carcraft PC (57) ABSTRACT

Status indicator devices for use with handheld transceiver devices are shown and methods of using the same are described. Status indicator devices are disposed between a battery and a handheld transceiver unit allowing a single battery to power both the status indicator device and the handheld transceiver unit. The status indicator devices are capable of wirelessly transmitting and/or receiving information and reproducing it visually, tactilely, or both.

20 Claims, 13 Drawing Sheets

STATUS INDICATORS FOR MOBILE VOICE DEVICES

BACKGROUND

Figure 1:
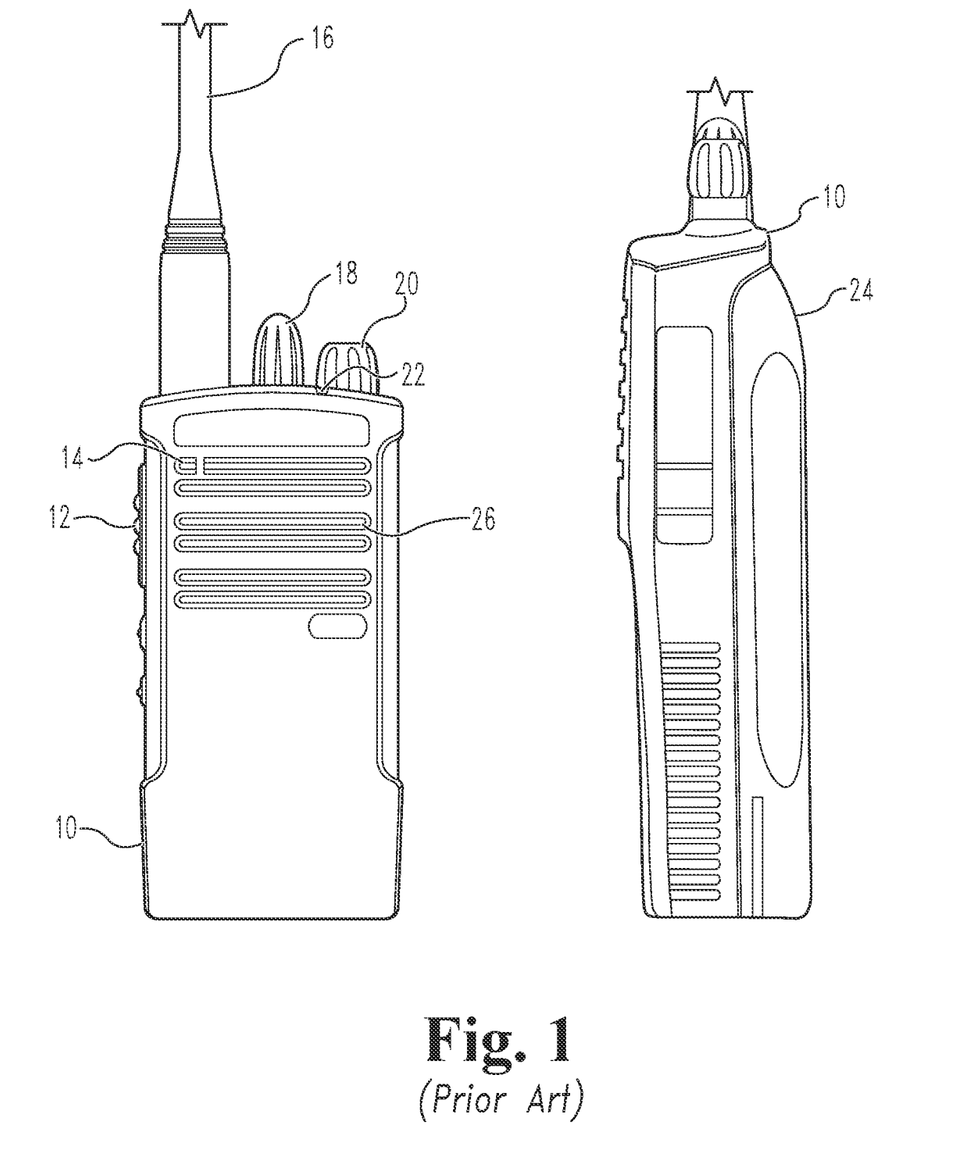
FIG. 1 is a front and side view of a handheld transceiver device as known in the prior art.

A handheld radio transceiver (commonly referred to as a "walkie talkie") is a portable two-way radio transceiver that allows for voice communication over short to moderate distances. The typical handheld transceiver 10 includes a push-to-talk button 12, one or more microphones 14, one or more speakers 26, an antenna 16 (which may be internal or external to the unit housing), a channel selection button or knob 18, a power and volume button or knob 20, and one or more indicator lights 22 that are illuminated when the unit is on and/or in use. The unit is powered by a removable battery 24 that is typically rechargeable.

Two or more handheld transceivers are operated by setting them to the same radio frequency/channel and by powering them on. Such devices typically default to operate in a standby or receive mode in which any device that is on and set to the same channel will receive a signal broadcast over the channel and generate a corresponding audio signal from the speaker. To transmit, a user depresses the push-to-talk button and speaks into the microphone. This arrangement where only one device may transmit at a time while multiple devices may listen is known as a half-duplex configuration.

Such devices are still commonly used in certain situations even in the age of ubiquitous mobile phone use. The ability to broadcast to multiple users simultaneously while also allowing any one of those users to respond to every other user simultaneously fills a niche that mobile phones do not. Settings such as construction sites, security or law enforcement organizations, movie or television sets, and the like frequently require the ability to simultaneously broadcast to a set of users. However, such devices are limited in that they are only capable of transmitting audio communications (typically voice) and lack the ability to transmit other types of information. Additionally, handheld transceivers may only transmit on one channel at a time.

DETAILED DESCRIPTION

Referring to the drawings, there are shown status indicator devices for mobile voice devices according to several embodiments. Although described herein in the singular, the present description will be understood to refer generally to all embodiments except where otherwise indicated. Discussion herein of features or functionality of any one embodiment disclosed herein should be understood by way of analogy to refer to features or functionality of any other embodiment except where otherwise indicated or apparent from the context.

There are many settings where handheld transceiver units (walkie-talkies) are still used as they provide advantages over mobile telephones such as durability, battery life, no requirement for a subscription service, and the ability for multiple users to simultaneously listen to a single speaker. Settings such as construction sites, law enforcement/security details, and film locations often require information and instructions to be communicated to multiple users spread over a large area quickly and efficiently. However, handheld transceiver units have drawbacks in that they typically only communicate information using sound (i.e.—voice) and typically can only communicate on one channel/frequency at a time. In some contexts, the ability to communicate only using sound and/or only to receivers that are set to one channel or frequency at a time is limiting and undesirable. For example, in some settings a user may not want to broadcast information to anyone within listening distance. Additionally, a user might not hear a particular command because they were not listening, there was loud ambient noise, the volume on the unit was inadvertently turned down, or other reasons. The ability of handheld transceiver units to communicate information visually is usually limited to a power indicator light that shows when the unit is turned on and a channel setting that shows what radio channel the unit is tuned to receive. What is needed is a device that can be fitted to existing handheld transceiver units and would allow them to transmit and receive information, reproducing it visually, tactilely, or both.

In one example a film or television set typically involves multiple people performing various tasks often spread over a large area. When filming on location these people may also be out of line of sight from one another while performing their duties. Handheld transceiver units allow a single person (director, assistant, etc.) to communicate quickly and efficiently with multiple people at once. The information being communicated might not be a single instruction (e.g.—move cameras to a different location) but a change in a status (e.g.—filming has stopped). If a single instruction is missed it can be repeated until it is heard and carried out. However, if a change in status is missed, repeating the change in status verbally might not be desirable (e.g.—having to give an audible command again once filming has begun) or it might lead to undesirable/wasteful situations (e.g.—continuing to hold up traffic while filming on location when filming had actually stopped). Additionally, it is common to have different groups of users assigned to different frequencies/channels (e.g.—cameras on channel 1, lighting on channel 2, etc.) so instructions that only apply to one group are not broadcast over all channels. In such settings it may still be desirable that certain instructions or status changes be simultaneously broadcast to all groups without having to issue the instruction to each channel individually.

Figure 4:
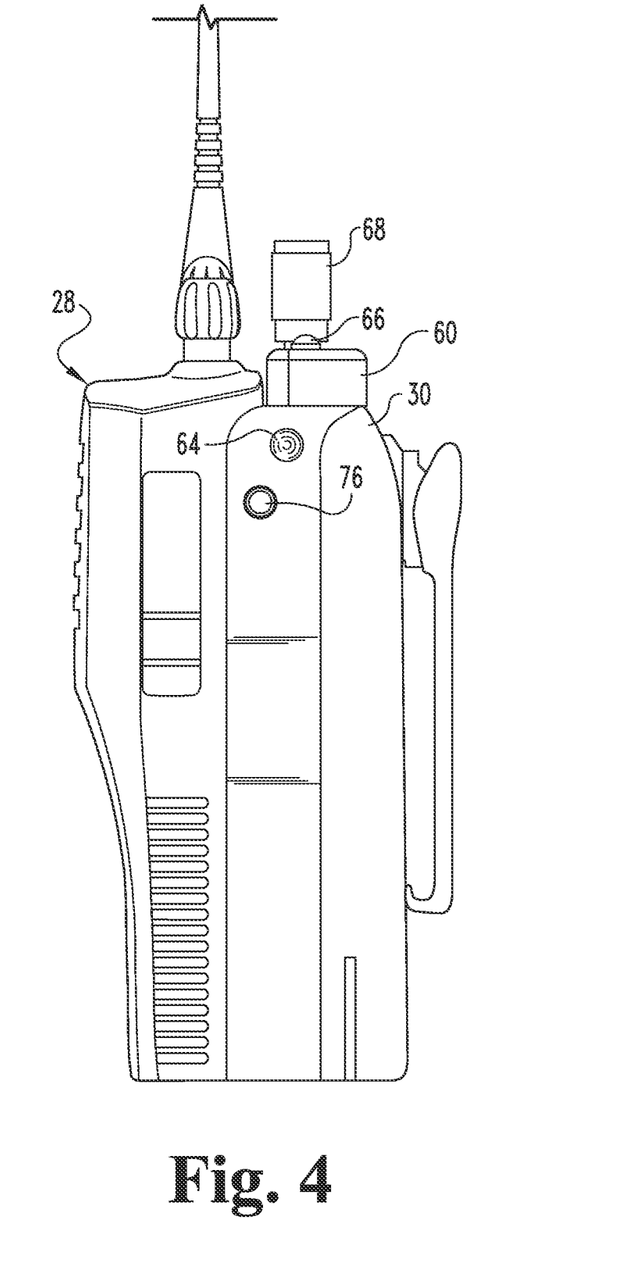
FIG. 4 is a side view of a handheld transceiver device and battery with a status indicator device according to one embodiment of the disclosed invention.

Many industries that currently use handheld transceivers (film/television, security/police, construction, etc.) would benefit from being able to also transmit and receive non-audio information using their existing equipment. A status indicator device according to the disclosed invention expands the utility of existing handheld transceiver units by both transmitting/receiving as well as displaying information visually and/or tactilely. As shown in FIG. 4, a status indicator unit is designed and configured to be operationally/electrically connected to an existing transceiver unit between the transceiver and its battery such that the battery powers the status indicator unit directly and the transceiver unit indirectly through the status indicator unit. The status indicator unit includes one or more status signaling features such as lights that may be controlled remotely by a dedicated control unit or by a status indicator unit having a control function such as using a switch or dial. The indicator lights are capable of producing one or more colors of light, either as a solid light or optionally flashing/pulsing as desired. The meaning of a particular color/pattern of light is determined prior to use by a user and communicated to the other users ahead of time.

In the context of on-location film production, different workers on a set might have different responsibilities depending on the status of the set. For example, one person might have the task of preventing bystanders from walking past an alley where they might appear in frame while shooting but allowing those same people to walk past when between shots. A solid green light might mean that no filming is taking place, so allow people to walk past the alley. A yellow light might mean that rehearsal is taking place, so allow people to walk past the alley, but don't allow them to linger or otherwise distract the rehearsal. A red light might mean that film is rolling, so prevent anyone from walking past the alley and being in the shot. The director or another person on the set may have a control unit or a status indicator unit having a control function selector that would allow them to change the light color/pattern on other status indicator units as the shooting status of the set changed. In other examples, one or more of the status indicator units might include other types of status signaling features such as a vibration motor, linear resonant actuator, or other device capable of provide tactile information to a user in addition to or instead of a light. In some situations, such as working at night or on low-light sets, a bright status indicator light might be undesirable, so a tactile indication and/or a dimmer control on an indicator light may be used. Continuing with the previous example, no vibration might mean no filming was taking place while a vibration pulse or pattern of pulses might mean filming had begun. Alternatively, a vibration signal might be sent as an indication that the status has changed and a user should look to see what light color is being displayed. These are some examples of ways to use status indicator devices such as those described herein. Different combinations of light(s), light intensity, and/or vibration can be coordinated to indicate different statuses in different settings as desired.

Figure 12:
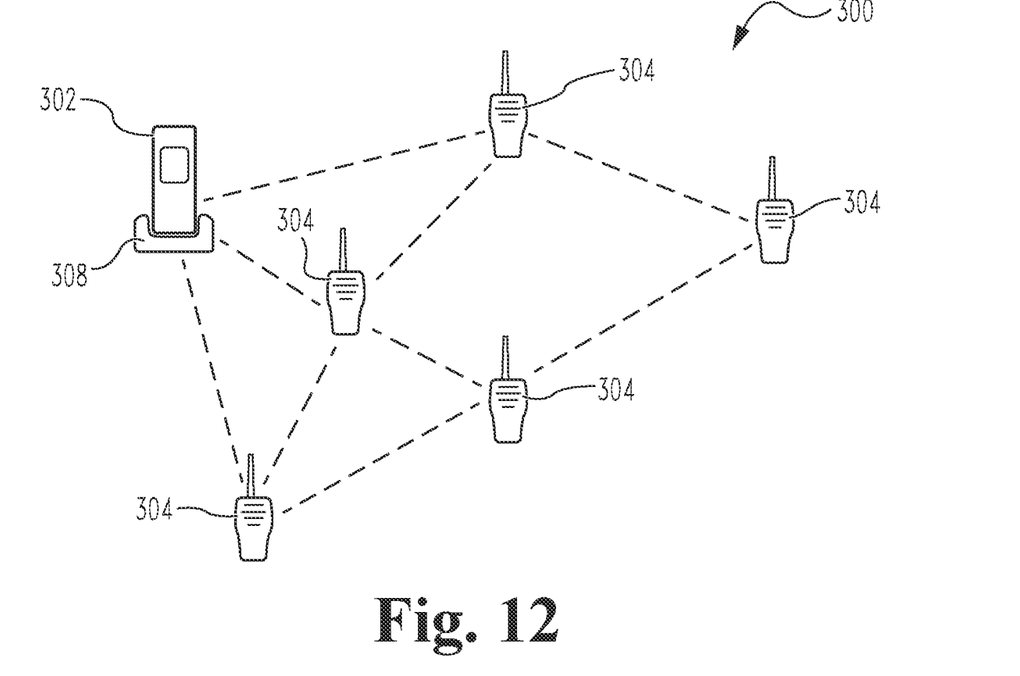
FIG. 12 is a diagram of a network of status indicator devices according to one embodiment of the disclosed invention.
Figure 13:
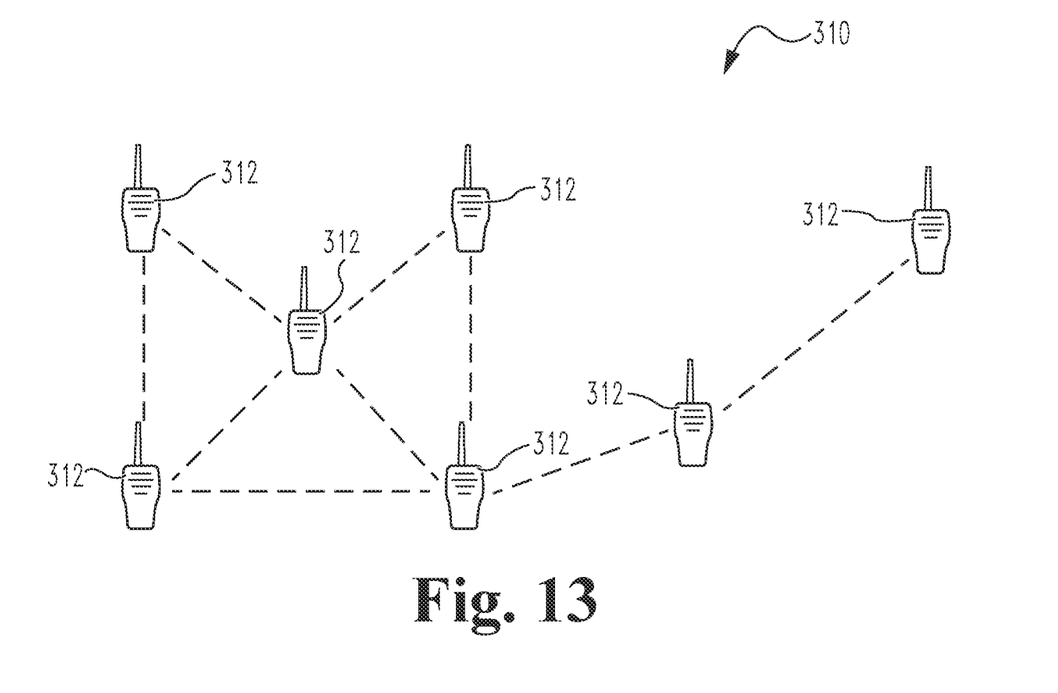
FIG. 13 is a diagram of a network of status indicator devices according to another embodiment of the disclosed invention.

Status indicator devices such as those disclosed herein may communicate with one another using a variety of suitable methods. Signaling between units may be accomplished using existing Wi-Fi networks (IEEE 802 protocol family), purpose-generated Wi-Fi networks (either created by separate devices and/or by the status indicator devices directly), low-power/wide-area (e.g.—LoRa) networks, a dedicated local area network, mobile telephone networks, radio-frequency identification (RFID), UHF radio waves (such as Bluetooth®), or other types of radio waves. Optionally a status indicator device according to the disclosed invention could use the existing transmission hardware and/or software of a handheld transceiver unit itself. Communication may be directly from one or more control units or via a mesh-type network where a signal is passed from one unit to another automatically. Such a mesh network allows individual users to still operate and receive signals from a control unit even when they are outside the effective range of the control unit so long as they are within the effective range of another status indicator device that had received the signal. Optionally, repeater units and/or additional status indicator devices may be placed at locations so as to extend the effective range of a control unit such as when operating in large outdoor settings. In still other examples, a stand-alone device 308 having one or more lights 302 as well as the ability to receive and transmit instructions 306 from one or more status indicator devices 304 might also be used to allow people who are not carrying a status indicator device to still be informed of status changes. One such example system 300 is shown in FIG. 12. FIG. 13 shows one example of a system 310 in which a plurality of transceiver devices equipped with status indicator devices 312 according to the disclosed invention are in communication 314 with one another. The status indicator devices 312 in this example automatically communicate with any other device within range. This means not every device needs to communicate with every other device directly, but all devices can communicate with one another either directly or indirectly via another device.

Figure 10:
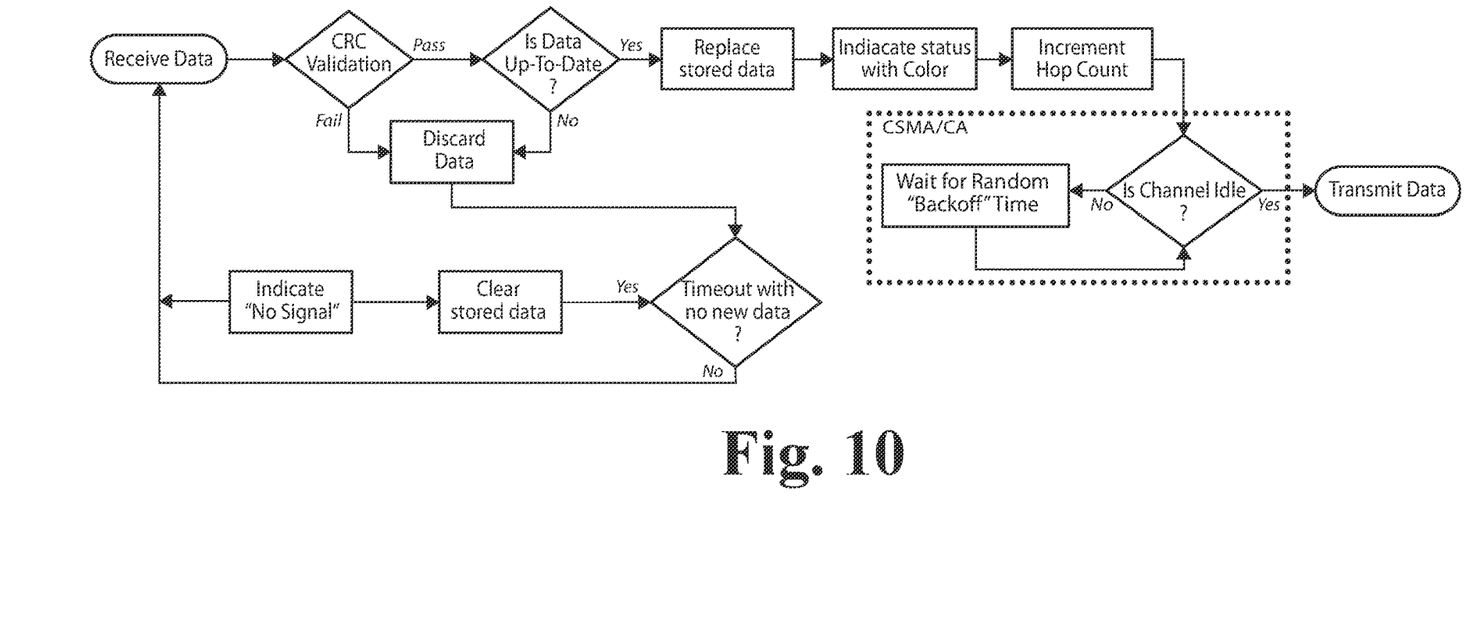
FIG. 10 is a flow chart indicating one method of using a status indicator device according to one embodiment of the disclosed invention.

FIG. 10 shows one example of how a mesh-type network using a plurality of status indicator devices as described herein might function. In this particular example, units should be able to ensure they have the most up-to-date data to prevent inaccurate status displays and/or retransmission of outdated or incorrect data. A receiving unit may accomplish this by comparing a timestamp associated with newly received data to a timestamp associated with previously received (and/or stored) data.

Generally, a wireless mesh network needs to have a way of handling packet collisions, that occur when the radio transmission has interference from another transmission source on the same frequency and cause corrupted data. A network may use a variety of techniques including Carrier-Sense Multiple Access with Collision Avoidance (CSMA/CA) before transmission to reduce the likelihood of a packet collision and/or a Cyclic Redundancy Check (CRC) upon receipt to filter out corrupted packets.

In some instances, there is still a chance that a packet could be corrupted and a CRC will yield a false positive. To handle this possibility, if no new and valid data is received within a specified time period (e.g.—three seconds), the program may time out, clear stored data, and prepare to receive the next data packet. While the data is cleared, the status indicator may indicate there is no signal with a particular light color that is not being used for other purposes. This is but one example of how the devices described herein may be used with a mesh-type network. Other examples using the disclosed devices are also contemplated.

Figure 2:
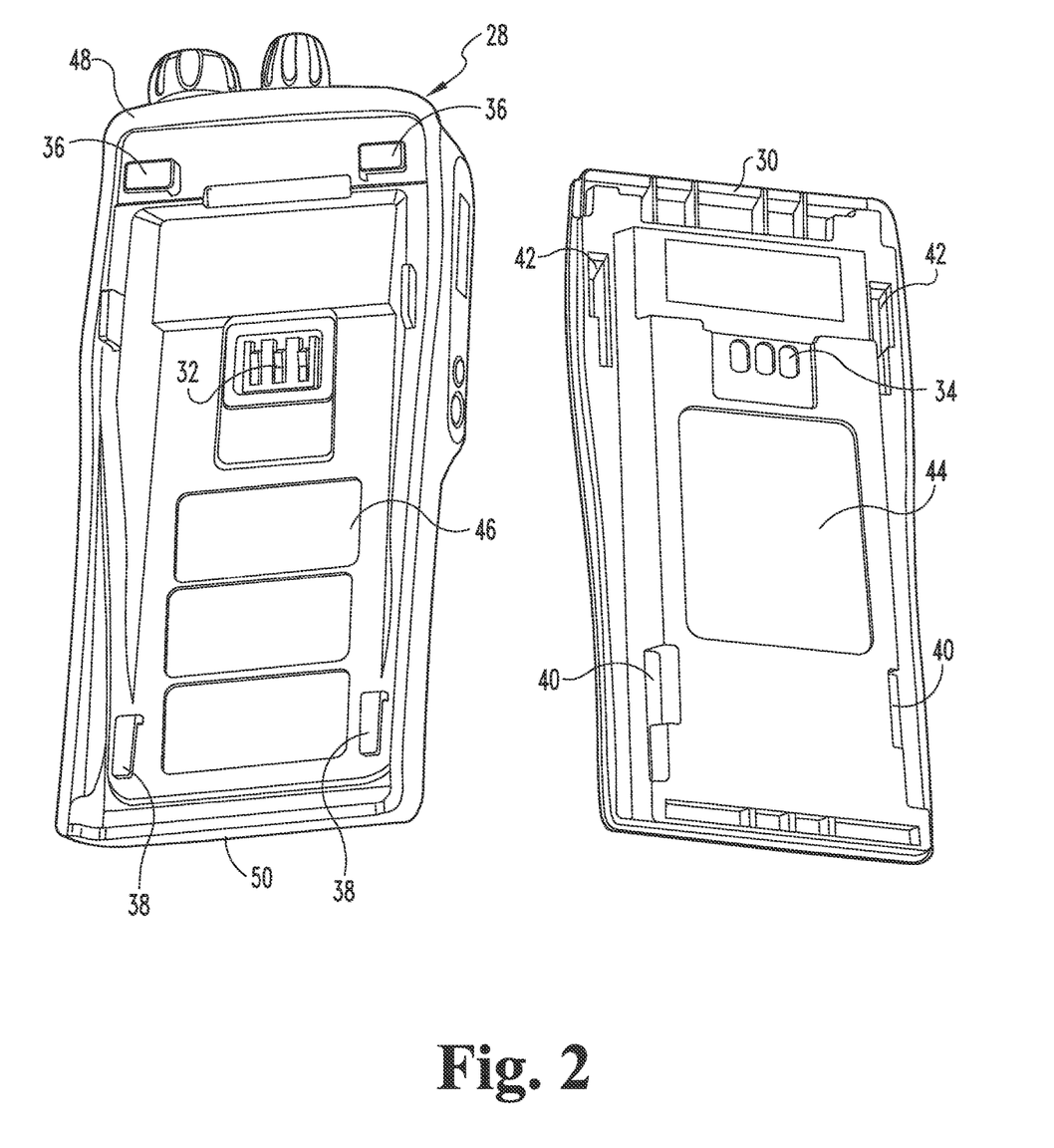
FIG. 2 is a plan view of a handheld transceiver device and battery.
Figure 3:
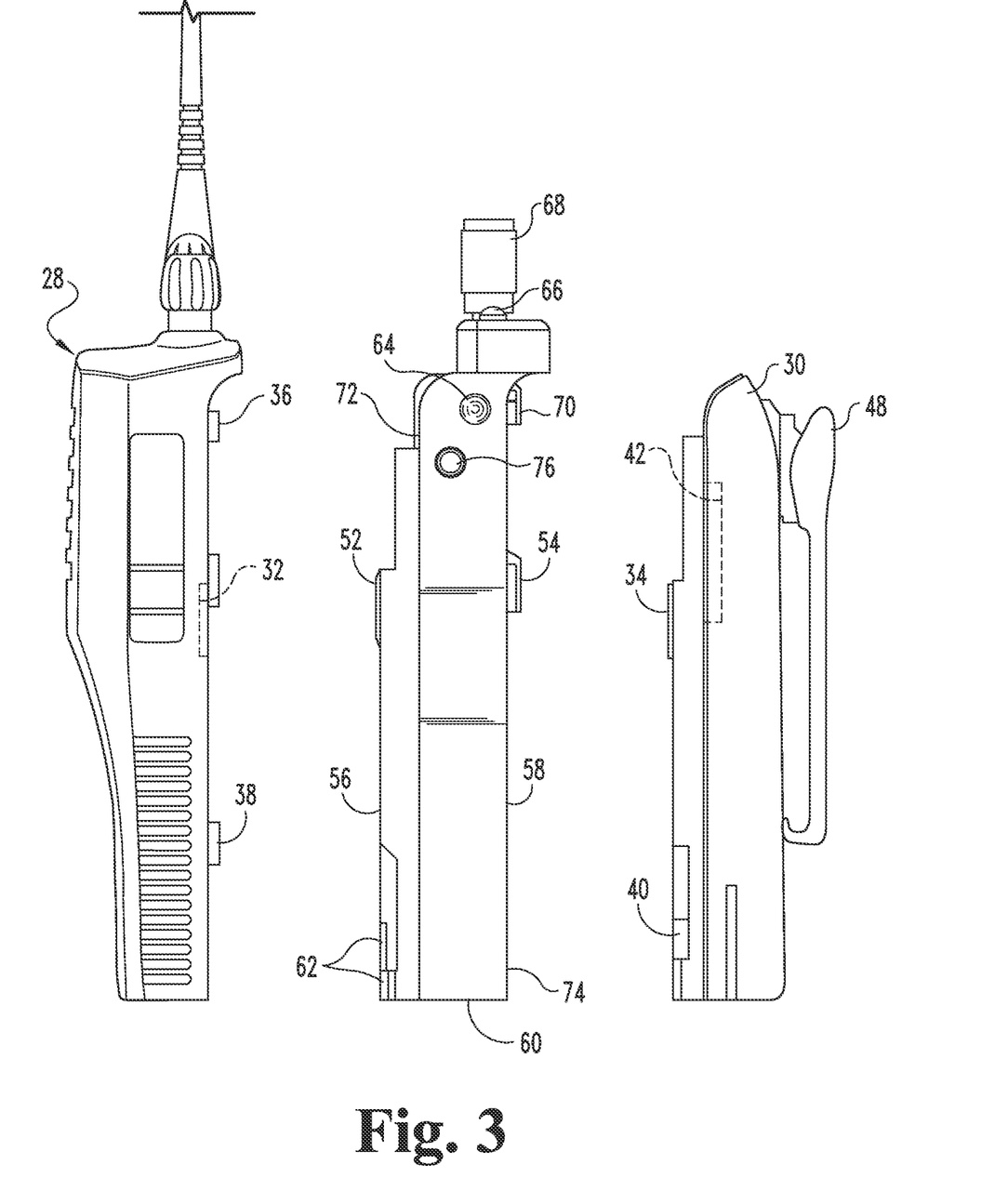
FIG. 3 is a side view of a handheld transceiver device and battery with a status indicator device according to one embodiment of the disclosed invention.

FIGS. 2-4 show an example of a handheld transceiver unit 28 and a corresponding battery unit 30 where the battery has been removed from the transceiver to show the battery-transceiver interface 44 and 46. The interface includes a battery contact 34 on the battery 24 and a transceiver contact 32 on the transceiver. The battery contact and transceiver contact are sized and configured such that when the battery is installed on the transceiver unit the battery contact and transceiver contact touch and are in electrical communication allowing power to flow from the battery to the transceiver. In some examples, the battery contact is also used to recharge the battery when it is placed in a charging unit (not shown). The battery may also include a separate charging contact point or port where the battery may be recharged either while still installed on the transceiver unit or in a separate charger.

The battery-transceiver interface 44 and 46 also includes one or more securing features that are sized and configured such that they interlock to secure the battery to the transceiver unit. In this particular example, the transceiver unit 28 includes two upper securing hooks 36 near the top 48 of the unit and two lower securing hooks 38 near the base 50 of the unit. In other examples the transceiver unit may include more or fewer securing features located at the same or different locations. The battery 30 includes upper securing slots 42 that correspond to the upper securing hooks 36 and two lower securing slots 40 that correspond to the lower securing hooks 38. When installed on the transceiver unit 28 the securing features of the transceiver unit interlock with the corresponding securing features of the battery 30 thereby securing the battery to the transceiver unit 28. In some examples either the battery or the transceiver unit includes a latch or catch that holds the battery to the transceiver unit when in a first position (i.e.—default) and releases the battery from the transceiver unit when in a second position (i.e.—depressed).

FIG. 3 shows a partially exploded side view of a transceiver unit 28 and a battery 30 with a status indicator device 60 according to one embodiment of the disclosed invention disposed therebetween. In this example, the status indicator device 60 includes at least one lower securing feature 62 corresponding to the lower securing hooks 38 of the transceiver unit 28 as well as one or more upper securing features 72 corresponding to the upper securing hooks 36. The securing features 62, 72 of the status indicator device 60 are configured to interact with the securing hooks 38, 36 of the transceiver unit 28 in a similar manner as the securing slots 40, 42 on the battery 30. In other examples the status indicator device will include a different number and/or configuration of securing features that correspond and interact with the securing features of a different transceiver unit and battery combination.

The status indicator device 60 shown in FIG. 3 further includes a transceiver contact 52 positioned on the transceiver interface side 56 and configured to contact and interact with the transceiver contact 32 in a similar fashion as the battery contact 34 such that, when making contact, they are in electrical communication and power may flow from the status indicator device 60 to the transceiver unit 28. The status indicator device 60 further includes a battery interface side 58 having a battery contact 54 positioned thereon and configured to contact and interact with the battery contact 34 in a similar fashion as the transceiver contact 32 such that, when making contact, they are in electrical communication and power may flow from the battery 30 to the status indicator device 60. The battery interface side 58 further includes one or more upper securing features 70 that correspond with the upper securing slots 42 on the battery 30 and one or more lower securing features 74 that correspond with the lower securing slots 40 of the battery 30. The securing features 70, 74 of the status indicator device 60 are configured to interact with the securing slots 42, 40 of the battery unit 30 in a similar manner as the securing hooks 36, 38 on the transceiver unit 28. In other examples the status indicator device will include a different number and/or configuration of securing features that correspond and interact with the securing features of a different transceiver unit and battery combination. Such features may include any combination of hooks, slots, pegs, clips, clasps, and the like.

The status indicator device 60 in this particular example further includes status signaling features in the form of a top indicator light 66 as well as a side indicator light 64. The device further includes a control knob 68 and an auxiliary device port 76. FIG. 4 shows a side view of the status indicator device 60 of FIG. 3 when engaged with the transceiver unit 28 and battery unit 30. The housing of the status indicator device may be made from any suitable material (composite, plastic(s), and the like) and may be colored/textured so as to match the transceiver unit housing and the battery unit housing so they appear to be a single, matching unit (typically all black). In other examples, the status indicator device housing may be a contrasting color (e.g.—red or yellow) so as to provide a visual indicator that a status indicator device is installed on a particular transceiver unit.

Figure 5:
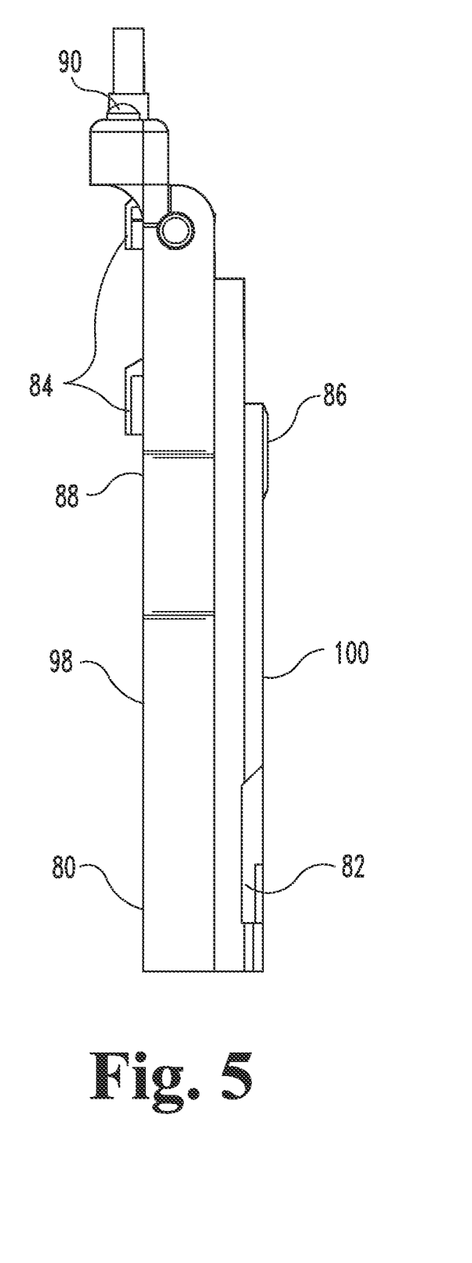
FIG. 5 is a side view of a status indicator device according to one embodiment of the disclosed invention.
Figure 6:
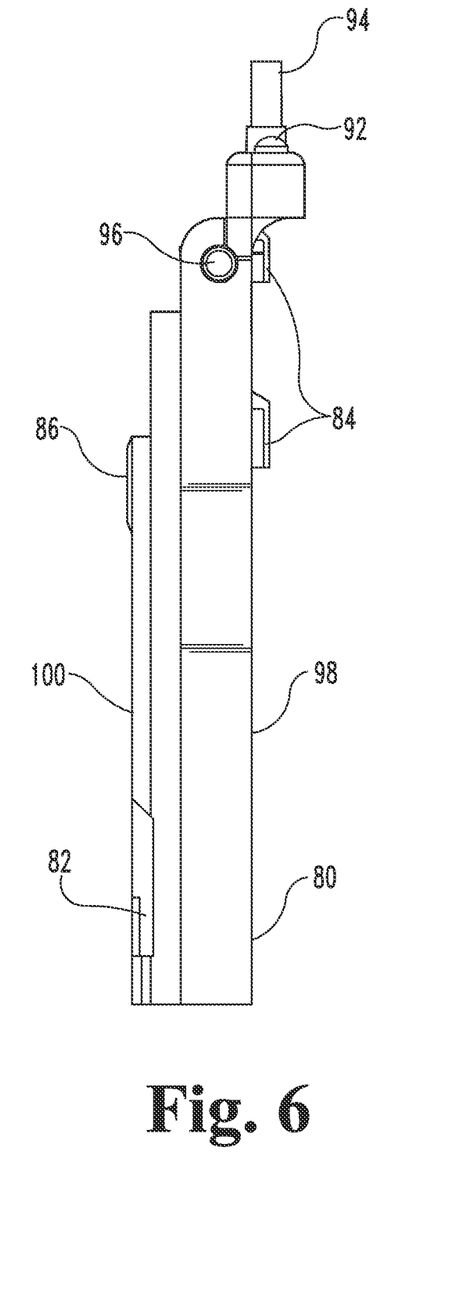
FIG. 6 is a side view of a status indicator device according to one embodiment of the disclosed invention.

FIGS. 5-6 show side views of a status indicator device 80 having upper securing features 84 on the transceiver interface side 98 and lower securing features 82 on the battery interface side 100. The status indicator device 80 further includes a transceiver contact 88 and a battery contact 86 that allow the status indicator device 80 to draw power from an attached battery and pass power to an attached transceiver unit. The status indicator device 80 also includes two top mounted indicator lights 90, 92, a switch 94 that functions as both a power switch as well as a dimmer/brightness control, and an auxiliary device port 96.

Figure 7:
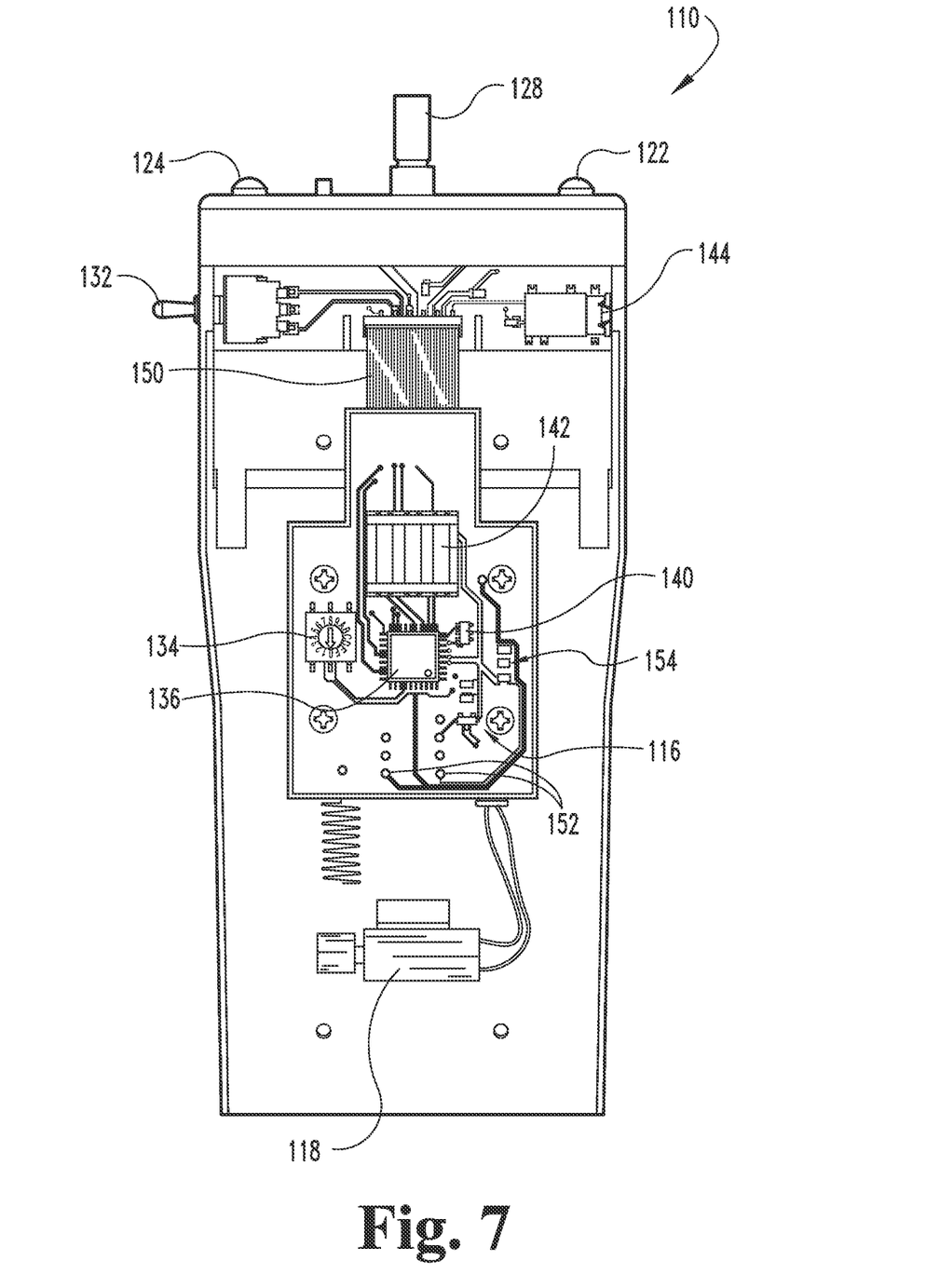
FIG. 7 is a front view of a status indicator device according to one embodiment of the disclosed invention.
Figure 8:
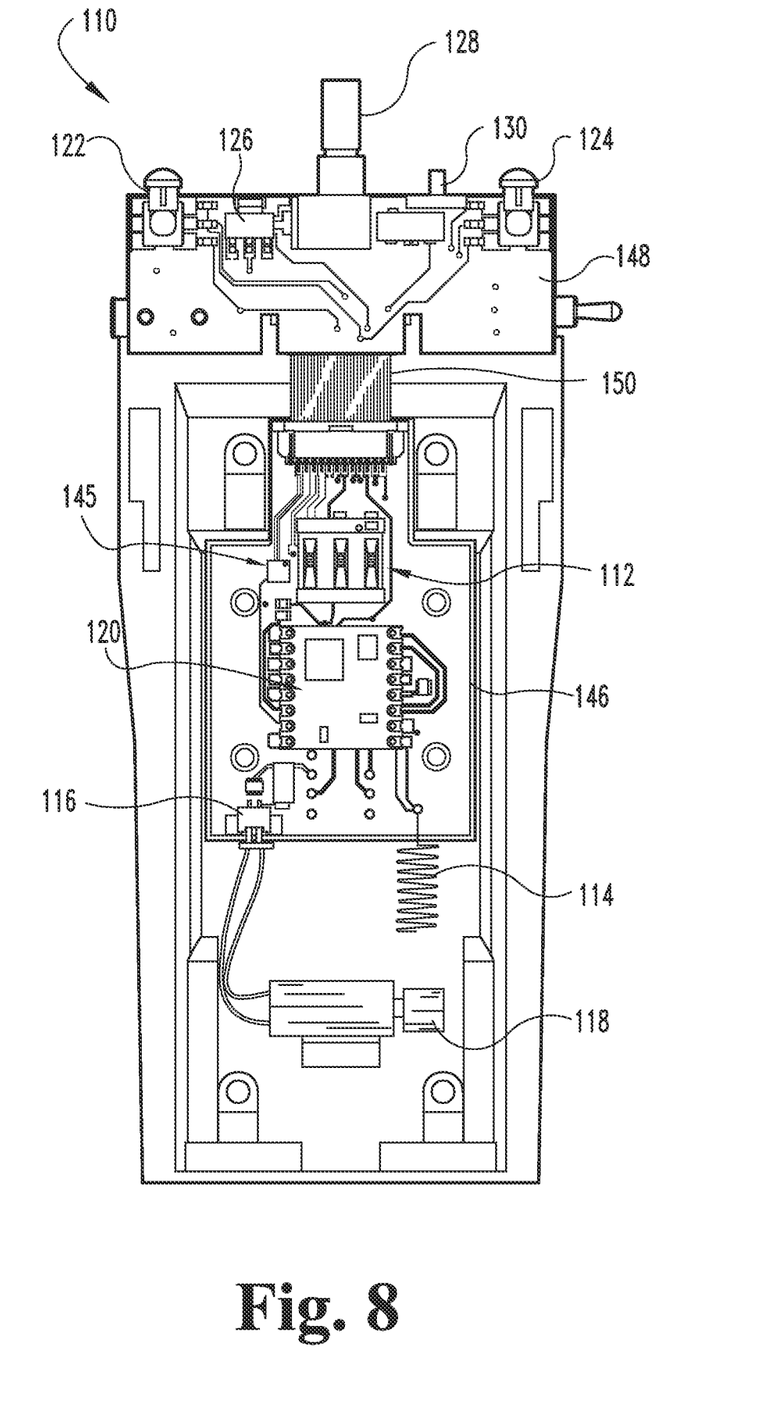
FIG. 8 is a rear view of a status indicator device according to one embodiment of the disclosed invention.

FIGS. 7-8 show one example of a status indicator device 110 according to the disclosed invention. In this particular example, the outer cover has been omitted to show the internal components from both the front/transceiver interface (FIG. 7) and the rear/battery interface (FIG. 8). This is one example of a status indicator device and other configurations using different combinations/arrangement of components are also contemplated. In this example, a printed circuit board (PCB) 146 is operationally connected to a battery contact 112 and to a transceiver contact 142 so as to allow the status indicator device 110 to draw power from a connected battery and pass power through to a connected transceiver unit. An RF transceiver module 120 is operationally connected to the PCB that is operationally connected to an internal antenna 114. A motor control unit 116 is operationally connected to the PCB and to a vibration unit 118 disposed within the housing at a distance from the PCB so as to not damage connections to the board. A switch 145 for toggling the function of an auxiliary device port 144 is operationally connected to the PCB 146. A second or auxiliary PCB 148 is operationally connected to the PCB 146 using a ribbon wire 150 or other suitable connection method. Connected to the second PCB 148 are two light sources 122, 124. In this particular example the light sources are LED, but other light sources optionally channeled through light pipes 123, 125 or fiber optic devices may also be used. In other examples, more or fewer light sources may be used and they may be placed at other locations on the unit as desired. The second PCB 148 also includes a voltage regulator 126, a switch 130 that enables/disables the vibration motor 118, and a power switch 128 that turns the unit on and off. Optionally, the power switch may also include additional functionality such as acting as a brightness control for the light sources. Optionally, even if the power switch for the status indicator device is switched off, power may still pass from the battery to the handheld transceiver unit such that the transceiver may still function normally even if the status indicator device is powered off.

Figure 15:
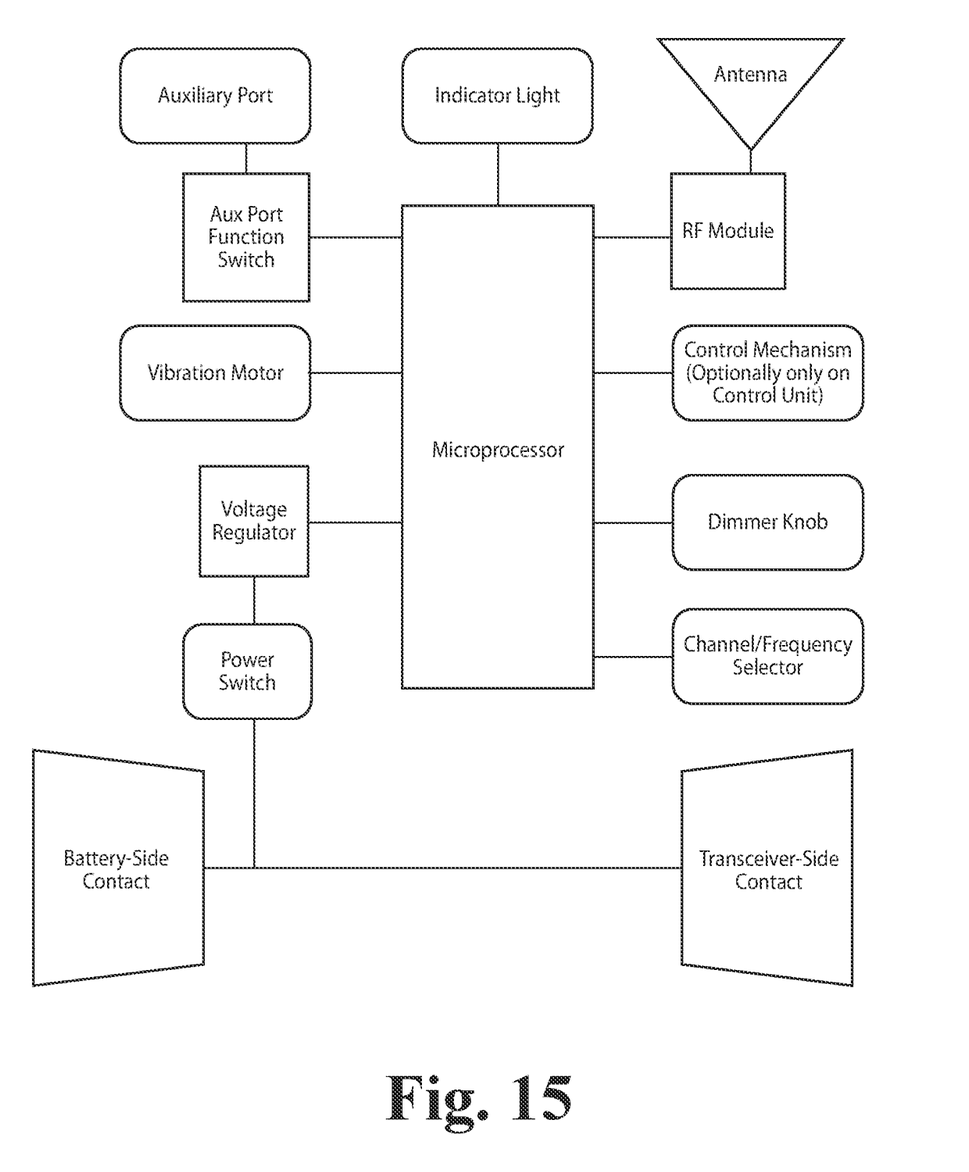
FIG. 15 is a block diagram of an example of a status indicator device according to one embodiment of the disclosed invention.

Continuing with the present example, the PCB is also operationally connected to a programmable microprocessor 136 that controls operation of the unit and that may be accessed via a port 152 for reprogramming. The PCB is also operationally connected to a timing crystal 140, reset circuit 154, and channel selection switch 134. The second PCB 148 is also operationally connected to an auxiliary device port 144 and to an indicator control selector 132. The indicator control selector is shown as a switch in this example and is optionally only included on units that are intended to be able to issue commands to/set the status for other units rather than simply being able to pass on commands/statuses. The switch may include a plurality of different positions that correspond to preprogrammed signals to be transmitted. For example, a switch may include three positions (e.g.—up, middle, and down) corresponding to three signals (e.g.—turn on red light, turn on yellow light, turn on green light). A user with such a control selector unit can then decide which signal is to be sent by the unit by positioning the switch in the position corresponding to the desired signal. In other examples, the switch may be a dial having two or more positions or a button capable of being set to different positions. A toggle type switch has the benefit of providing the user with tactile feedback as to its present state without having to look at it. A dial might also include a ridge or other tactile feature that would provide similar feedback. A block diagram of another example of a status indicator device according to the disclosed invention is shown in FIG. 15.

Figure 9:
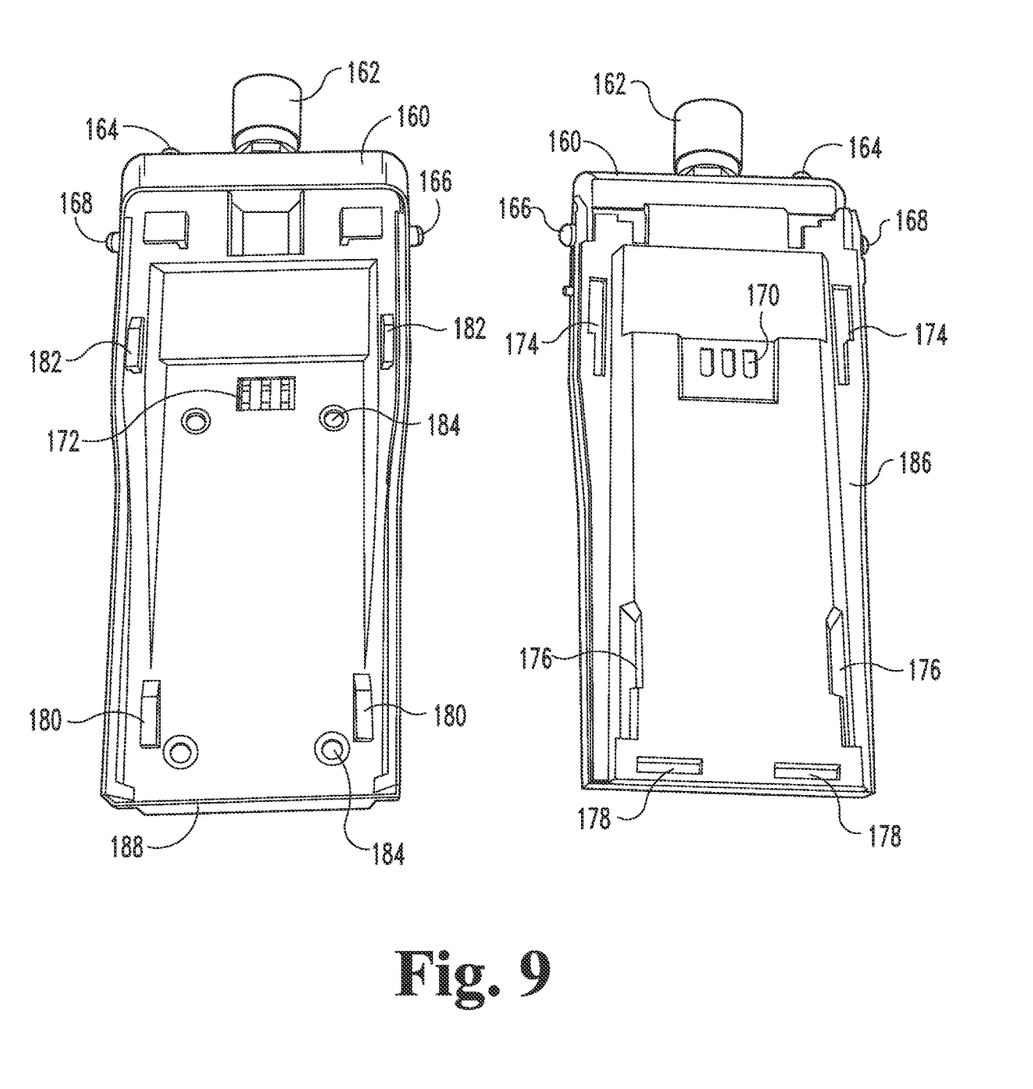
FIG. 9 is a front view and a rear view of a status indicator device according to one embodiment of the disclosed invention.

FIG. 9 shows a front and rear view of another example of a status indicator device 160 according to the disclosed invention. In this example, the status indicator device 160 has a transceiver interface side 186 and a battery interface side 188. The status indicator device 160 also includes a power/control switch 162 and status signaling features (lights) 164, 166, 168. The transceiver interface side 186 includes a transceiver contact 170 as well as a plurality of securing features 174, 176, 178 designed and configured to interact with securing features on a transceiver unit thereby securing the status indicator device 160 to the transceiver. The battery interface side 188 includes a battery contact 172 as well as a plurality of securing features 180, 182 designed and configured to interact/interlock with onto securing features on a battery unit thereby securing the status indicator device 160 to the battery. Optionally, the status indicator device 160 includes one or more securing devices (such as screws or clips) 184 that secure the transceiver interface side 186 of the device to the battery interface side 188 of the device.

Figure 11:
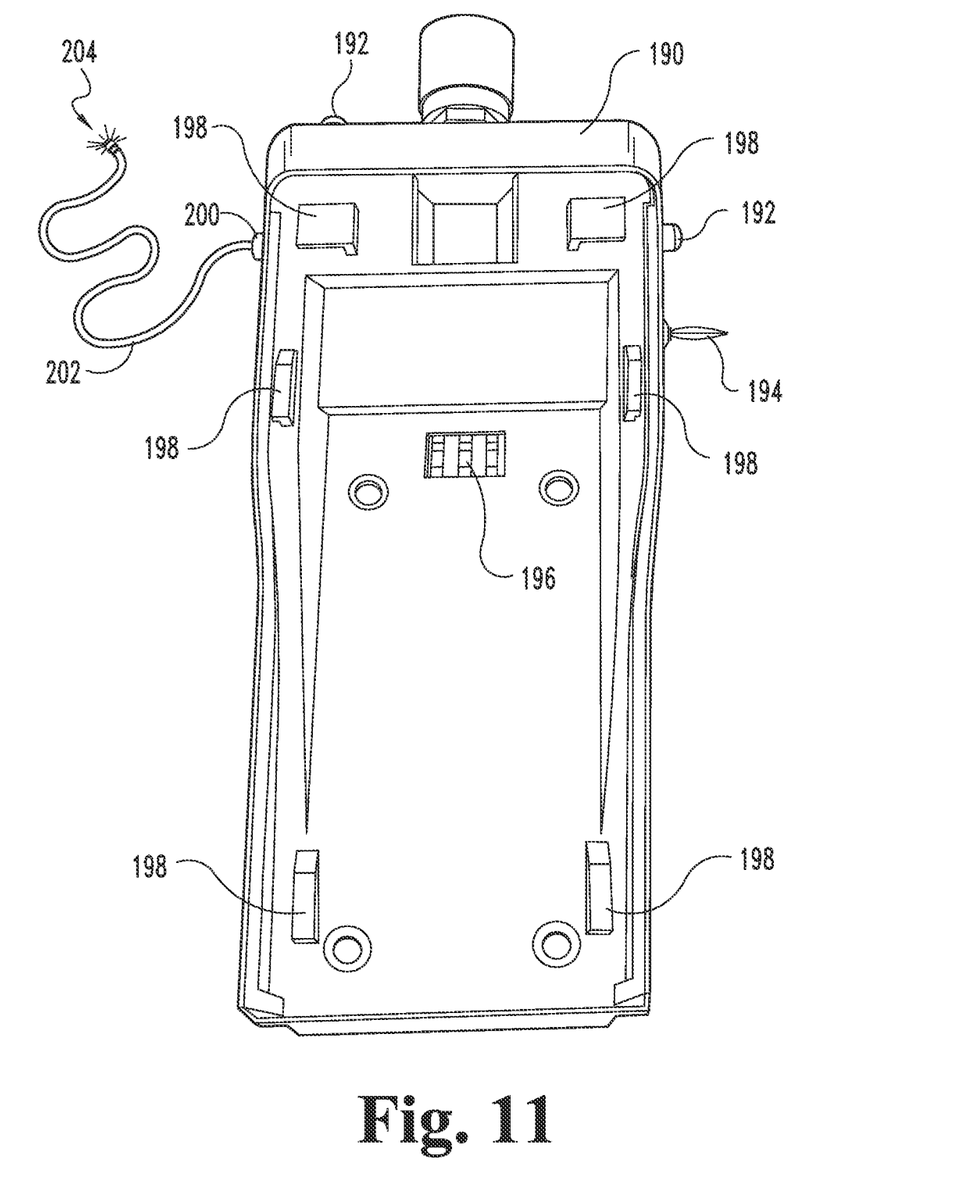
FIG. 11 is a front view of a status indicator device according to one embodiment of the disclosed invention.

FIG. 11 shows another example of a status indicator device 190 according to the disclosed invention. In this example, the status indicator device 190 includes a battery contact 196, an indicator control selector 194, a plurality of securing features 198, a plurality of indicator lights 192, and an auxiliary device port 200. A light extension 202 is plugged into the auxiliary device port 200 such that when a particular light status is set (e.g.—green light on) an auxiliary light 204 is set to the same status. The light extension 202 allows the auxiliary light 204 to be worn by a user (e.g.—clipped to a lapel or collar) so it may be visible to the user and/or others without having to look down at the status indicator device 190 itself.

Figure 14:
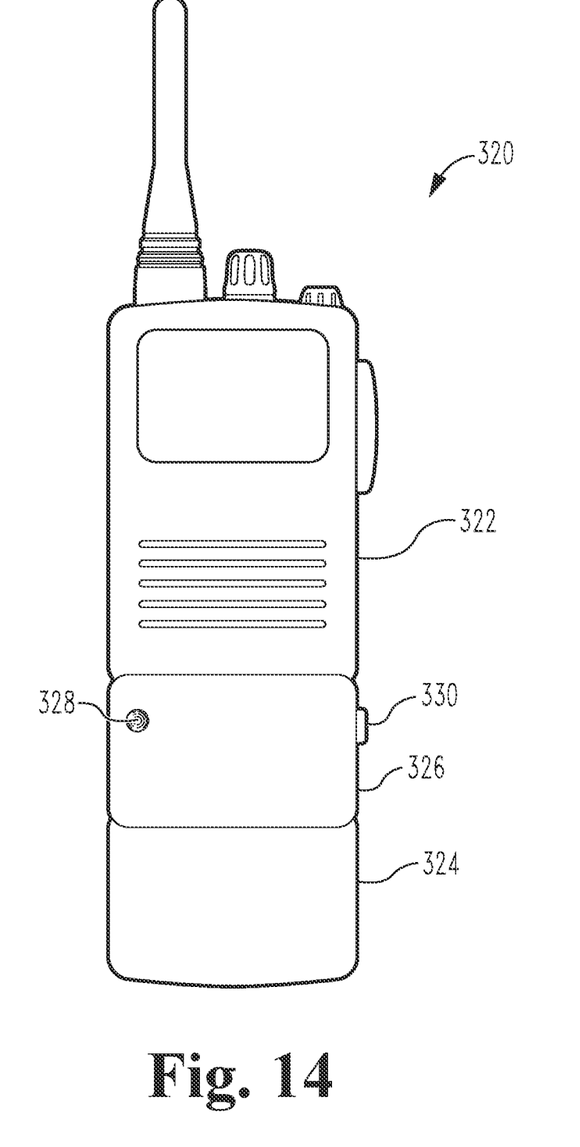
FIG. 14 is a front view of a handheld transceiver device and battery with a status indicator device according to one embodiment of the disclosed invention.

FIG. 14 shows another example of a status indicator device 320 according to the disclosed invention adapted for use with a handheld radio transceiver 322. In this particular example, the radio transceiver 322 has a battery unit 324 that connects to the base of the transceiver unit rather than to the back. The status indicator unit 326 includes a status indicator light 328 as well as an indicator control selector 330. The status indicator unit 326 also includes other features discussed with respect to the previously discussed examples.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A status indicator device for use with a handheld transceiver unit and battery unit, the status indicator device comprising:
  a transceiver interface configured to interfacing with the handheld transceiver unit, the transceiver interface having:
    a transceiver contact configured to transmitting power from the status indicator device to the handheld transceiver unit;
    at least one securing feature sized and configured for securing the status indicator device to the handheld transceiver unit;
  a battery interface configured to interfacing with the battery unit, the battery interface having:
    a battery contact configured to transmitting power from the battery to the status indicator device;
    at least one securing feature sized and configured for securing the status indicator device to the battery unit;
  a receiving unit configured to receiving a status change signal;
  a transmitting unit configured to transmitting the status change signal; and
  a status signaling feature configured to being turned on and off in response to a status change signal.

2. The status indicator device of claim 1 wherein the status signaling feature is a light.

3. The status indicator device of claim 2 wherein the light is configured to changing color in response to a status change signal.

4. The status indicator device of claim 2 further comprising a dimmer control configured to controlling the brightness of the light.

5. The status indicator device of claim 1, wherein the status signaling feature produces tactile feedback.

6. The status indicator device of claim 5, wherein the status signaling feature is a vibration motor.

7. The status indicator device of claim 1 further comprising a status control selector configured to generating a status change signal.

8. The status indicator device of claim 7 wherein the status control selector is a toggle switch.

9. The status indicator device of claim 1 wherein the transmitting unit and receiving unit operate using radio waves.

10. The status indicator device of claim 9 wherein the transmitting unit and receiving unit operate on one or more of a low-power/wide-area network, a Wi-Fi network, and UHF radio waves.

11. A status indicator device for use with a handheld transceiver unit and a battery unit, the status indicator device comprising:
   a transceiver interface side for interfacing with the handheld transceiver unit, the transceiver interface side having:
     a transceiver contact configured to transmitting power from the status indicator device to the handheld transceiver unit;
     at least one securing feature sized and configured for securing the status indicator device to the handheld transceiver unit;
   a battery interface side for interfacing with the battery unit, the battery interface side having:
     a battery contact configured to transmitting power from the battery to the status indicator device;
     at least one securing feature sized and configured for securing the status indicator device to the battery unit;
   a receiving unit configured to receiving a status change signal;
   a transmitting unit configured to transmitting the status change signal; and
   a status indicator light configured to being turned on and off in response to a status change signal.

12. The status indicator device of claim 11, wherein the status indicator light is configured to changing color in response to a status change signal.

13. The status indicator device of claim 11 further comprising a dimmer control configured to controlling the brightness of the status indicator light.

14. The status indicator device of claim 11 further comprising a status control selector configured to generating a status change signal.

15. The status indicator device of claim 14 wherein the status control selector is a toggle switch.

16. The status indicator device of claim 11 wherein the transmitting unit and receiving unit operate using radio waves.

17. The status indicator device of claim 16 wherein the transmitting unit and receiving unit operate on a low-power/wide-area network.

18. The status indicator device of claim 16 wherein the transmitting unit and receiving unit operate on a Wi-Fi network.

19. The status indicator device of claim 16 wherein the transmitting unit and receiving unit operate using UHF radio waves.

20. The status indicator device of claim 11, further comprising a vibration motor unit configured to providing tactile feedback in response to a status change signal.

* * * * *